(12) United States Patent
Fuller

(10) Patent No.: US 6,796,021 B2
(45) Date of Patent: Sep. 28, 2004

(54) COMBINATION OF STATOR CORE FOR AN ELECTRICAL MACHINE AND A STATOR CORE MANUFACTURING

(75) Inventor: Robert Fuller, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 210 days.

(21) Appl. No.: 10/193,559

(22) Filed: Jul. 11, 2002

(65) Prior Publication Data

US 2004/0007928 A1 Jan. 15, 2004

(51) Int. Cl.$^7$ .......................... H02K 15/00; H02K 5/00
(52) U.S. Cl. .......................... 29/732; 29/738; 29/609; 29/596; 310/91
(58) Field of Search .......................... 29/732, 738, 609, 29/596; 310/89, 91, 71; 228/112.1, 113, 114, 184

(56) References Cited

U.S. PATENT DOCUMENTS

| | | | |
|---|---|---|---|
| 3,095,983 A | 7/1963 | Hanna | |
| 3,243,987 A | 4/1966 | Saylor | |
| 3,325,026 A | 6/1967 | Benedick | |
| 3,652,889 A * | 3/1972 | Reece et al. | 310/259 |
| 3,830,488 A | 8/1974 | Wilger et al. | 269/296 |
| 3,860,228 A | 1/1975 | Cronier | 269/54.5 |
| 3,918,697 A | 11/1975 | Gregory | 269/289 |
| 4,202,539 A | 5/1980 | Polastri et al. | 269/70 |
| 4,279,559 A | 7/1981 | Stumf | 414/431 |
| 4,330,726 A * | 5/1982 | Albright et al. | 310/254 |
| 4,345,861 A | 8/1982 | Aarseth | 410/68 |
| 4,452,558 A | 6/1984 | Muraguchi | 414/433 |
| 5,069,382 A * | 12/1991 | Misiak et al. | 228/146 |
| 5,681,033 A | 10/1997 | Bullen | 269/71 |
| 6,072,259 A * | 6/2000 | Kawabata et al. | 310/216 |
| 6,247,634 B1 * | 6/2001 | Whitehouse | 228/112.1 |

* cited by examiner

*Primary Examiner*—Carl J. Arbes
*Assistant Examiner*—Tai Van Nguyen

(57) ABSTRACT

A stator core (20) and manufacturing frame (40) combination, a stator core plate punching member (30), and methods of rolling a core body (22) without risk of significant damage to the core body (22) are provided. The combination preferably includes a stator core (20) having a substantially cylindrical and elongate core body (22). The core body (22) preferably includes a plurality of plate punching members (30). Each of the plurality of plate punching members (30) has a substantially smooth outer surface (32). The combination also preferably includes a manufacturing frame (40) positioned to substantially underlie the core body (22). The frame (40) preferably includes a plurality of spaced-apart rollers (45) each positioned to contact the substantially smooth outer surface (32) of each of the plurality of place punching members (30).

13 Claims, 5 Drawing Sheets

COMBINATION OF STATOR CORE FOR AN ELECTRICAL MACHINE AND A STATOR CORE MANUFACTURING

FIELD OF THE INVENTION

The present invention relates to the field of support structures and, more particularly, to support structures and methods which can support large sized and rotatable objects.

BACKGROUND OF THE INVENTION

Support structures such as frames and other support devices have been used over the years for checking, testing, manufacturing, curing, winding, repairing, and performing many other functions on large sized objects such as portions of power generators or power generation systems. For example, U.S. Pat. No. 4,452,558 by Muraguchi titled *A Support Structure For Checking And Repairing Heavy Rotatable Objects* discloses a system which has a pair of spaced-apart roll support bases that each rotatably supports one end of a rotatable object. Each roll support base has a pair of rolls which are supported on an adjustable surface plate of a base frame by a spherical support mechanism. Due to the spherical support mechanism, the rolls on the support bases can uniformly support both ends of a cylindrical shaft extending through the rotatable object without imparting any thrust to the rolls even when horizontal leveling is not achieved. Because the rotatable object has a cylindrical shaft extending therethrough, the outer surface of the shaft smoothly rotates along the support rolls and the weight of the object is carried by the shaft. Many objects, however, do not have a centrally located shaft for rotation and carrying of weight.

Accordingly, with some large sized objects, a support shaft does not form part of the object and is neither practical nor feasible. For example, as shown in the prior art FIG. 1, a stator core 10 of a power generation system does not conventionally have a centrally located support shaft and yet often still needs to be rotated for winding, testing, curing, or other functions such as during manufacturing processes. The stator core 10 has a substantially cylindrical core body 12 and can be turned on rollers 17 to facilitate winding and resin drainage such as during an oven cure cycle. The core body 12 has a plurality of plate punching members 13 aligned along the core body 12. These current systems often have an inner frame, hydrogen frame i.e. frame through which hydrogen cooling gas flows or rings 15 permanently attached to the stator core 10 that are used as tools to be positioned against spaced-apart rollers 17 of a manufacturing frame 16 to allow rolling to occur without damage to the stator core 10. In many applications, however, these inner frames or rings are not required for any reason other than rolling. This can increase costs associated with construction and can increase the amount of time required for manufacturing or testing such objects.

SUMMARY OF THE INVENTION

With the foregoing in mind, the present invention advantageously provides in combination a stator core and manufacturing frame that reduces costs and time associated with manufacturing or testing stator cores, and reduces the risk of significant damage during rolling of the stator cores. The present invention also advantageously provides stator core plate punching members and methods of rolling a core body that allow rollers of a manufacturing frame to roll thereagainst without risk of significant damage to the stator core such as during winding or oven curing cycle operations. The present invention additionally provides a stator core and manufacturing frame combination that can reduce or minimize axial reaction load from rolling the stator core and thereby reduce or minimize the structure needed to support the load.

More particularly, the present invention provides a combination stator core for an electrical machine and a stator core manufacturing frame. The combination preferably has a stator core having a substantially cylindrical and elongate core body. The core body preferably includes a plurality of punching members. Each of the punching members has a substantially annular plate body member having a smooth outer surface. A manufacturing frame is preferably positioned to substantially underlie the core body of the stator core. The frame preferably includes a plurality of spaced-apart rollers each positioned to contact the substantially smooth outer surface of each of the plurality of plate punching members of the core body when positioned to roll thereagainst during rolling of the stator core so that rolling occurs with less risk of damage to the stator core. If any variations in the substantially smooth outer surface of the plate punching members occurs, then these variations are preferably slight and smooth as well.

The present invention also provides a plate punching member for a stator core of a power generator. The plate punching member preferably comprises a substantially annular plate body member having a substantially smooth and uniformly arcuate outer surface. A plurality of these plate body members may be aligned in side-by-side relation with one another to form at least portions of a stator core. When a plurality of the plate body members are aligned to form a stator core, a roller of a frame contacting the outer surface of each of the plate body members is able to roll substantially smoothly along the outer surfaces without risk of significant damage to the stator core. The plate punching member also preferably has a substantially circular opening formed in a medial portion of its plate body member, the substantially circular opening extending therethrough. A plurality of slots is formed in the plate body member. Each of the plurality of slots preferably has a slot open end and a slot bottom. Each of the plurality of slots preferably extends outwardly in a radial direction from the slot open end closely adjacent the opening formed in the medial portion of the plate body member toward the slot bottom spaced-apart from the outer surface.

The present invention additionally provides a method of rolling a substantially cylindrical core body while lessening the risk of significant damage to the core body. The method preferably includes positioning a plurality of rollers of a frame to contact portions of outer surfaces of a plurality of plate punching members of a substantially cylindrical core body and rotating the core body in either a clockwise or counterclockwise direction about an axis longitudinally extending through the core body without significant risk of damage to the core body.

Accordingly, the present invention allows rolling directly on the outside diameter of the core body and eliminates the need for an inner frame, hydrogen frame, or rings to roll the core. By contrast, these additional frames or rings, according to the prior art, were often permanently attached to the core body or used as tools. Thus, their elimination according to the present invention can save construction costs and time, and yet the core body is still not likely to be damaged during rolling. By providing a more consistently cylindrical shape for the core body according to the present invention, frictional forces that otherwise would tend to screw the core body axially with respect to the rollers are reduced. When the plurality of rollers extend along the sides of the core body and are aligned together, the axial reaction load from rolling can be significantly reduced or minimized to thereby reduce or minimize the necessary support structure needed to support the load.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE EMBODIMENTS

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime notation indicates similar elements in alternative embodiments.

Figure 2:
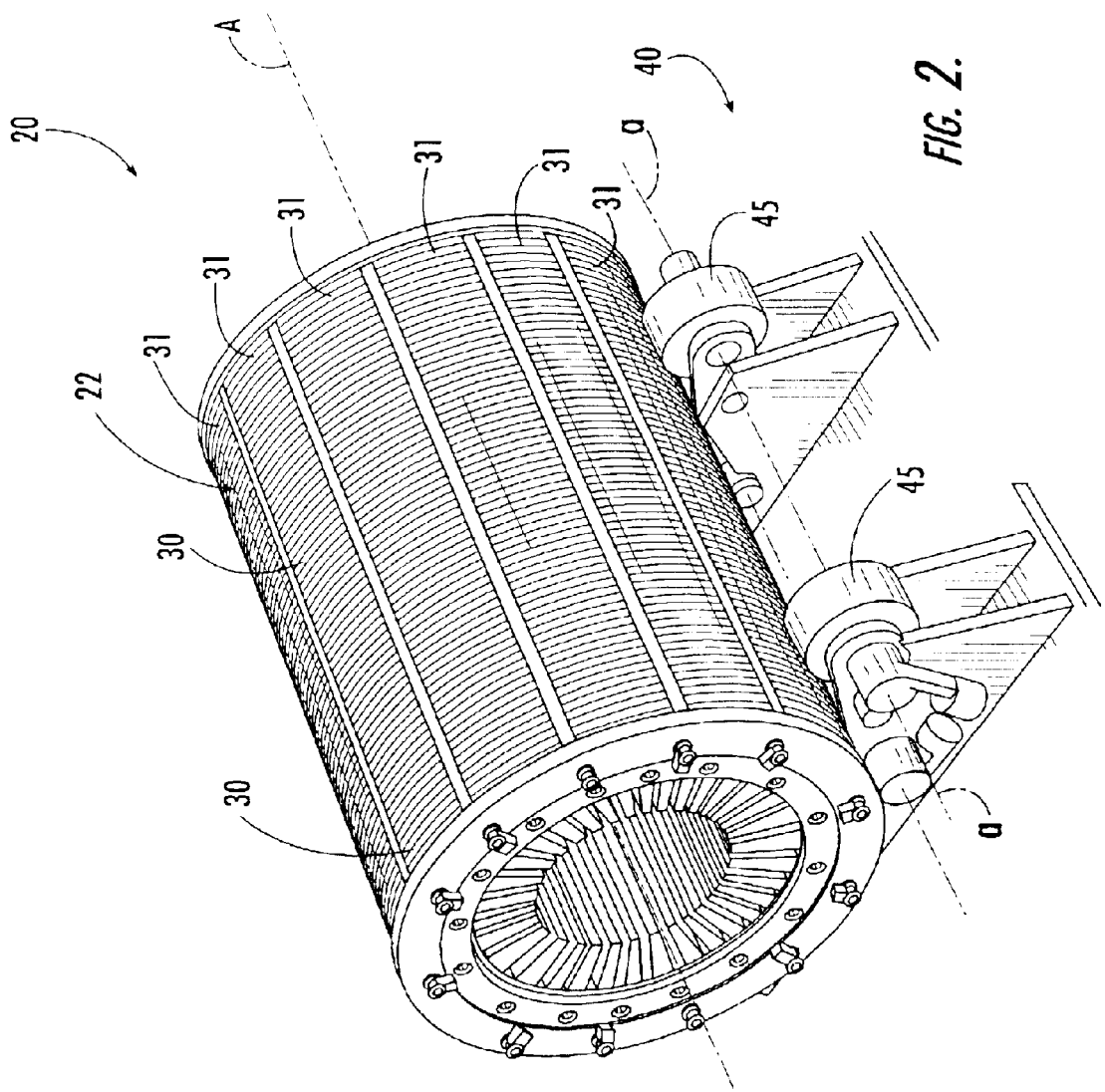
FIG. 2 is a perspective view of a stator core and manufacturing frame combination according to the present invention.
Figure 3:
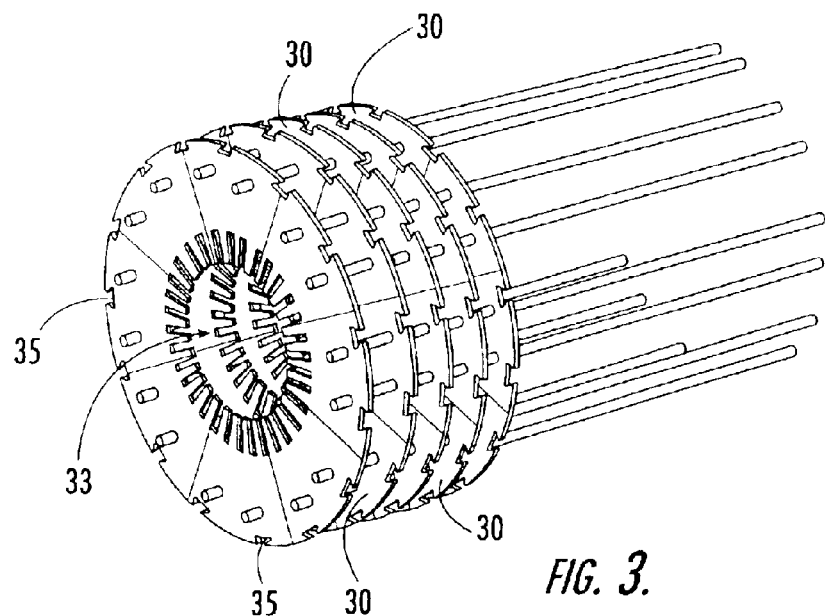
FIG. 3 is an exploded fragmentary perspective view of a plurality of plate punching members according to the present invention.
Figure 6:
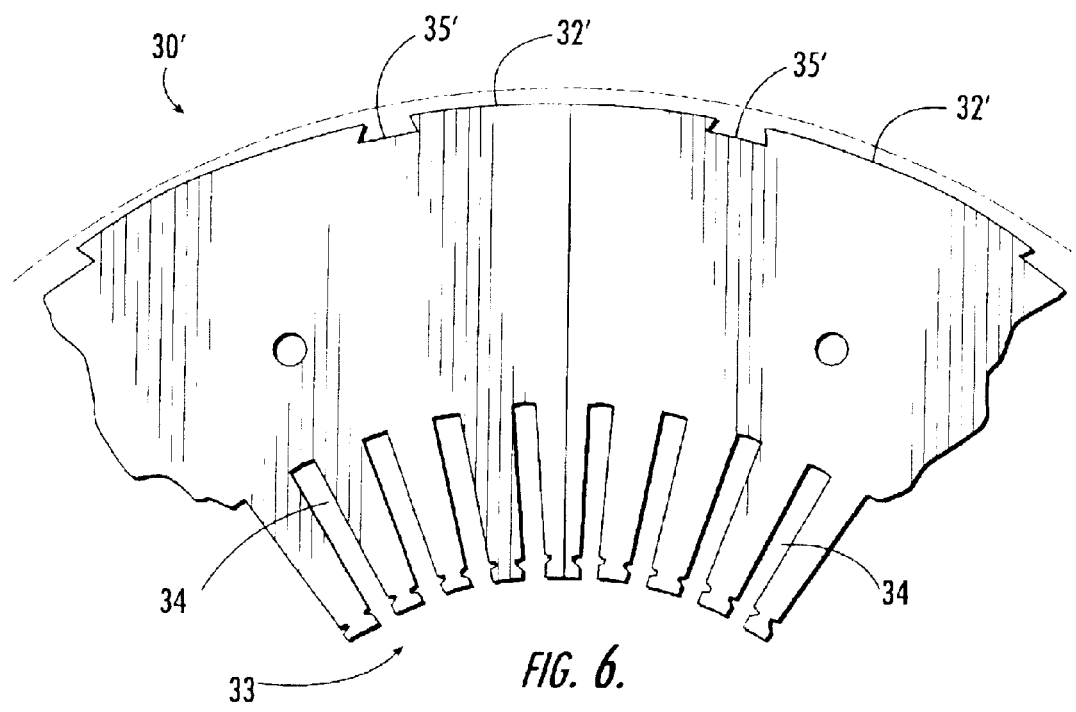
FIG. 6 is a fragmentary front plan view of a plate punching member according to an alternative embodiment of the present invention.
Figure 7:
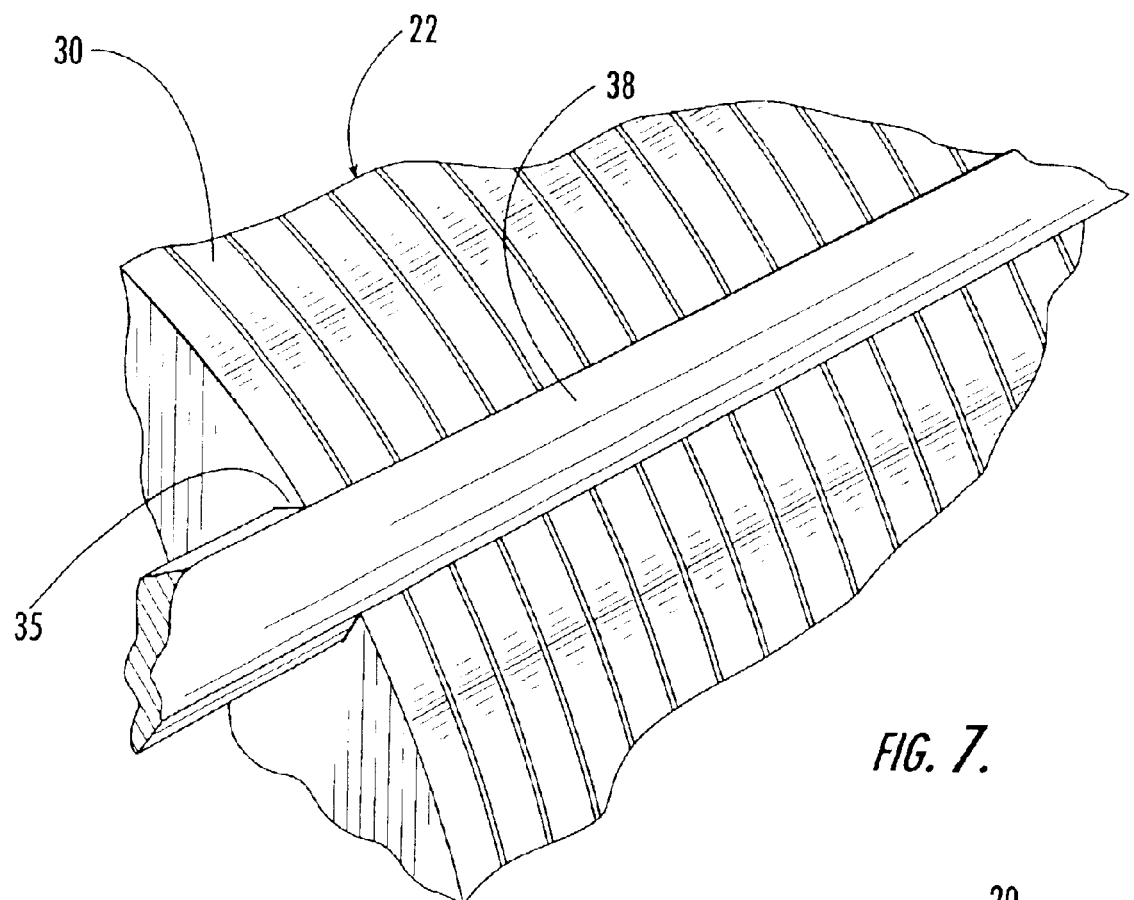
FIG. 7 is a fragmentary perspective view of a keybar positioned in a keybar slot formed in the plurality of plate punching members according to the present invention.

FIG. 2 illustrates in combination a stator core 20 for an electrical machine, such as a power generator, and a manufacturing frame 40 according to the present invention. The combination preferably has a stator core 20, which preferably has a substantially cylindrical and elongate core body 22. The core body 22 preferably includes a plurality of plate punching members 30 or lamination members arranged in side-by-side relation with another. As perhaps best shown in FIGS. 3–4 and 6, each of the plurality of plate punching members 30 preferably has a substantially smooth and uniformly arcuate outer surface 32. Each plate punching member 30 is preferably formed of a plurality of punching section members 31 (e.g., about eight punching sections per complete annular plate punching member 30), each positioned adjacent another one of the plurality of punching section members 31 to thereby in combination define the substantially arcuate outer circumference of each plate punching member 30. Each plate punching member 30 preferably is relatively thin (e.g., about 0.5 millimeters thick); several thousand plate punching members can be aligned in side-by-side relation to form a core body.

Figure 1:
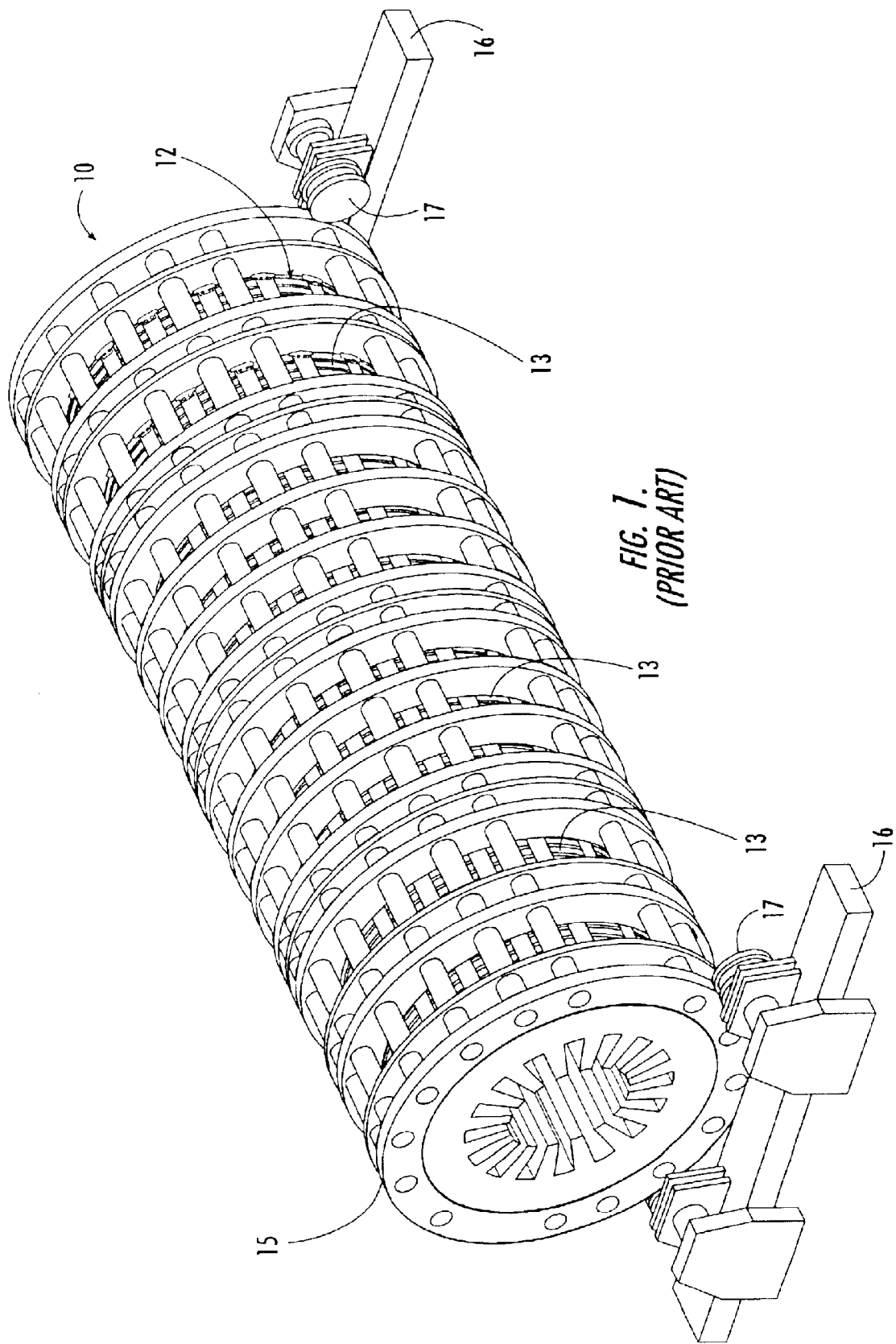
FIG. 1 is a perspective view of a stator core and manufacturing frame combination according to the prior art.
Figure 4:
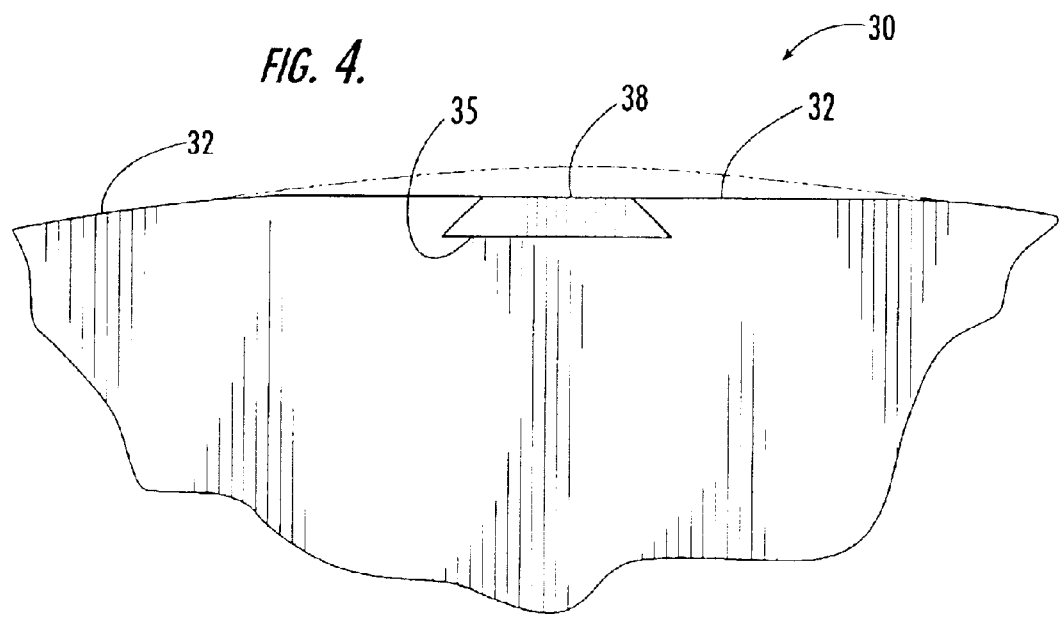
FIG. 4 is an enlarged fragmentary front plan view of a plate punching member according to the present invention.
Figure 5:
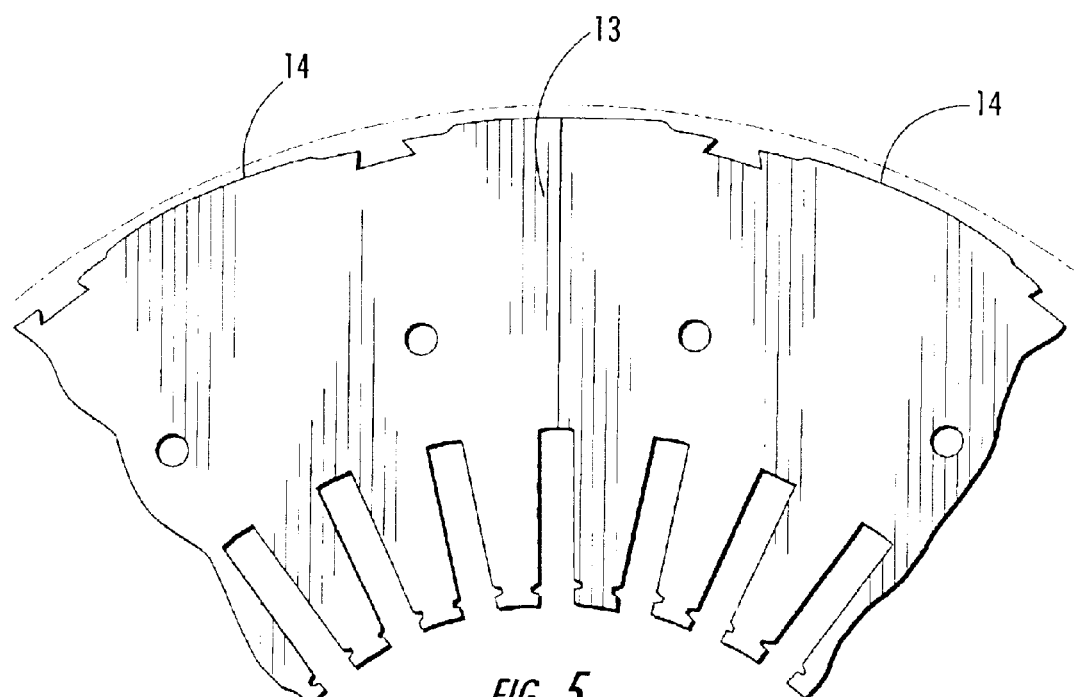
FIG. 5 is a fragmentary front plan view of a plate punching member according to the prior art.

Any variation or variations in the substantially smooth outer surface 32 of a plate punching member 30 is preferably relatively slight, creating a substantially smooth variation, unlike the outer surface 14 of the prior art plate punching members 13 as shown in FIGS. 1 and 5. For example, portions of the outer surface 32 of the plate punching members 30 around the keybar slots 35 or keybars 38 can be somewhat flat (e.g., less arcuate, as shown in FIG. 4) so that the core body does not have to be a perfect cylinder according to the present invention. Having a perfect cylinder can be advantageous (see, e.g., alternative embodiment in FIG. 6 wherein a plate punching member 30' having an outer surface 32' with keybar slots 35' is formed to have a more smoothly cylindrical shape). There can be manufacturing constraints or trade-offs, however, which can make the use of a perfect cylindrically core body perhaps less desirable, as will be readily appreciated by one skilled in the art.

Figure 8:
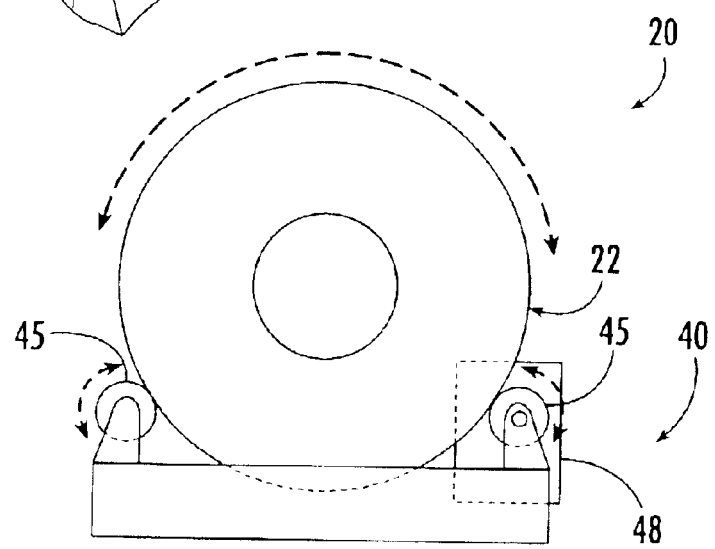
FIG. 8 is a front plan view of a combination stator core and manufacturing frame having a plurality of rollers indicating directions of rotation according to the present invention.

A manufacturing frame 40 preferably is positioned to substantially underlie the core body 22 of the stator core 20. The frame 40 includes a plurality of spaced-apart rollers 45 each positioned to contact the substantially smooth and uniformly arcuate outer surface 32 of each of the plurality of plate punching members 30 of the core body 22 to roll thereagainst during rolling of the stator core 20 so that rolling occurs with less risk of damage to the stator core 20 (see FIGS. 2 and 8). The plurality of rollers 45 preferably support the stator core 20 on the manufacturing frame 40 during rolling in manufacturing, maintenance, and/or repair processes. Often the stator core 20 can rotate 360 degrees on the manufacturing frame 40 many times during such processes. The plurality of rollers 45 of the frame 40 preferably include a first pair of rollers positioned along one side of the core body 22 and a second pair of rollers positioned along the opposite side of the core body 22. The first pair of rollers preferably is aligned with the second pair of rollers as shown. The manufacturing frame 40 also preferably includes a drive assembly 48 (e.g., a motor, a drive linkage or shaft, conductors, and a power source), as understood by those skilled in the art, to drive at least one, and preferably all, of the plurality of rollers 45 to thereby roll the core body 22. It will be understood by those skilled in the art, however, that other techniques for driving the stator core 20 on the rollers 45 can be used as well according to the present invention.

In some embodiments, the substantially smooth outer surface 32 of each of the plurality of plate punching members 30 can include at least one keybar slot 35, or a plurality of keybar slots 35 as shown. The at least one keybar slot 35 has a fill material 38 positioned therein to substantially fill the at least one keybar slot. The fill material 38, for example, can be a keybar. If so, the keybar may be bottomed in the at least one keybar slot 35 and may be flattened or shaved down so that the outer surface of the keybar is substantially flush with the outer surface or outer diameter of the plate punching member 30. As perhaps best shown in FIGS. 3, 4 and 6, each of the plurality of plate punching members 30 of the core body 22 preferably has a substantially arcuate outer circumference, has a substantially hollow inner arcuate opening 33 extending therethrough, and includes a plurality of slots 34 extending radially outward from the opening. Coils (not shown) of the stator core 20 are preferably positioned in the slots 34 as understood by those skilled in the art.

As shown in FIGS. 2–4 and 6–8, the present invention also provides a method of rolling a substantially cylindrical core body 22 with reduced risk of damage to the core body 22. The method preferably includes positioning a plurality of rollers 45 of a frame 40 to contact portions of outer surfaces 32 of a plurality of plate punching members 30 of a substantially cylindrical core body 22 and rotating the core body in either a clockwise or counterclockwise direction about an axis A longitudinally extending through the core body (see FIG. 2). Preferably, each of the plurality of rollers 45 also has a substantially cylindrical shape. The step of rotating the core body 22 advantageously can include driving at least one of the plurality of rollers 45 of the frame 40 so that the at least one roller 45 rotates about an axis a longitudinally extending through the roller 45 (see FIG. 2). The outer surface 32 of each of the plurality of plate punching members 30, preferably is substantially arcuate and substantially smooth. Any variations are preferably slight and substantially smooth as well. For example, portions of the outer surface 32 of each plate punching member 30 around the keybar slots 35 or keybars 38 can be somewhat flat (e.g., less arcuate, as shown in FIG. 4) so that the core body does not have to be a perfect cylinder (see, e.g., FIG. 6) according to the present invention.

As shown in FIG. 2, the step of positioning preferably includes positioning the core body 22 to substantially overlie the frame 40 and lowering the core body 22 to contact each of the plurality of rollers 45 of the frame 40. The method can also include aligning the plurality of rollers 45 with respect to each other along the core body 22 and supporting the core body 22 with the plurality of aligned rollers 45. The core body, as shown, is preferably the core body 22 of a stator core 20 of a power generator. Nevertheless, other types of core bodies can be used as well according to the present invention. Also, each of the plurality of plate punching members 30 can include at least one keybar slot 35 formed therein. The at least one keybar slot 35, however, if used, preferably has fill material 38 positioned therein. The method can also then include abuttingly contacting outer surfaces of the fill material 38 with at least one of the plurality of rollers 45 during the step of rotating without imparting significant damage to the stator core 20.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed is:

1. A combination of stator core for an electrical machine and a stator core manufacturing frame, the combination comprising:
   a stator core having a substantially cylindrical core body, the core body including a plurality of aligned plate punching members, each of the plurality of plate punching members having a substantially smooth outer surface; and
   a manufacturing frame underlying at least a portion of the core body of the stator core, the frame including a plurality of spaced-apart rollers each positioned to contact the substantially smooth outer surface of adjacent plate punching members to roll thereagainst during rolling of the stator core.

2. A combination as defined in claim 1, wherein the substantially smooth outer surface of each plate punching member is substantially circular.

3. A combination as defined in claim 1, wherein the substantially smooth outer surface of each plate punching member has at least one keybar slot therein, and wherein said stator core further comprises bars received in the keybar slots.

4. A combination as defined in claim 1, wherein each plate punching member has an inner arcuate opening with a plurality of slots extending radially outwardly therefrom.

5. A combination as defined in claim 1, wherein each plate punching member comprises a plurality of punching section members each positioned adjacent another one of the plurality of punching section members to thereby in combination define a substantially arcuate outer circumference.

6. A combination as defined in claim 1, wherein the plurality of rollers comprises a first pair of rollers positioned along one side of the elongate core body and a second pair of rollers positioned along the opposite side of the elongate core body, the first pair of rollers being aligned with the second pair of rollers.

7. A combination as defined in claim 1, wherein the manufacturing frame further includes a drive assembly positioned to drive at least one of the plurality of rollers.

8. A combination of stator core for an electrical machine and a stator core manufacturing frame, the combination comprising:
   a stator core having a substantially cylindrical core body, the core body including a plurality of aligned plate punching members;
   each of the plurality of plate punching members having a substantially smooth outer surface with at least one keybar slot therein, and having an inner arcuate opening with a plurality of slots extending radially outwardly therefrom; and
   a manufacturing frame underlying at least a portion of the core body of the stator core, the frame including a plurality of spaced-apart rollers each positioned to contact the substantially smooth outer surface of adjacent plate punching members to roll thereagainst during rolling of the stator core.

9. A combination as defined in claim 8, wherein the substantially smooth outer surface of each plate punching member is substantially circular.

10. A combination as defined in claim 8, wherein said stator core further comprises bars received in the keybar slots.

11. A combination as defined in claim 8, wherein each plate punching member comprises a plurality of punching section members each positioned adjacent another one of the plurality of punching section members to thereby in combination define a substantially arcuate outer circumference.

12. A combination as defined in claim 8, wherein the plurality of rollers comprises a first pair of rollers positioned along one side of the elongate core body and a second pair of rollers positioned along the opposite side of the elongate core body, the first pair of rollers being aligned with the second pair of rollers.

13. A combination as defined in claim 8, wherein the manufacturing frame further includes a drive assembly positioned to drive at least one of the plurality of rollers.

* * * * *